US006954874B1

(12) United States Patent
Daferner et al.

(10) Patent No.: US 6,954,874 B1
(45) Date of Patent: Oct. 11, 2005

(54) DIAGNOSTIC METHOD AND DIAGNOSTIC SYSTEM FOR MONITORING AVAILABLE RESOURCES IN A PRODUCTION PROCESS

(75) Inventors: Martin Daferner, Sindelfingen (DE); Stefan Putzlocher, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 338 days.

(21) Appl. No.: 10/019,699

(22) PCT Filed: Jun. 15, 2000

(86) PCT No.: PCT/EP00/05500

§ 371 (c)(1), (2), (4) Date: May 6, 2002

(87) PCT Pub. No.: WO01/02978

PCT Pub. Date: Jan. 11, 2001

(30) Foreign Application Priority Data

Jul. 2, 1999 (DE) ................................ 199 30 446

(51) Int. Cl.[7] ................................................ G06F 11/00

(52) U.S. Cl. .............................. 714/1; 700/97; 700/99; 700/107; 705/7

(58) Field of Search .................... 705/8, 7, 10; 700/97, 700/99, 107; 714/1

(56) References Cited

U.S. PATENT DOCUMENTS

| | | | | |
|---|---|---|---|---|
| 6,151,582 | A * | 11/2000 | Huang et al. .................. | 705/8 |
| 6,477,660 | B1 * | 11/2002 | Sohner .......................... | 714/1 |

FOREIGN PATENT DOCUMENTS

| | | |
|---|---|---|
| DE | 4116277 | 12/1991 |
| EP | 560765 | 7/1994 |
| EP | 488246 | 5/1998 |
| WO | WO 98/08177 | 2/1998 |

* cited by examiner

*Primary Examiner*—Richard Chilcot
(74) *Attorney, Agent, or Firm*—Crowell & Moring LLP

(57) ABSTRACT

The invention relates to a diagnosis method which permits continuous monitoring of the available resources in a production process, into which a number of supply links are incorporated in the form of a network and supply a system provider or other supply links with raw materials, semifinished products, components and services. Each supply link has an input buffer, an output buffer and a process stage, on the basis of the design of which the supply link determines an identification number which characterizes the operating state of this supply link. The predicted demands of the system provider and the current reserves in the buffers of each supply link are used as a basis to calculate—using the identification numbers of the supply links—for each supply link whether its reserves satisfy the predicted demands of the system provider, i.e. whether it is capable of supplying. Deficits in the stocks of a supply link are notified to all the other supply links, so that a high transparency of the current state of the resources in the supply network is achieved without the supply links having to disclose internal matters concerning their processes. The method is suitable in particular for monitoring resources in supply networks into which supply links outside the company are incorporated. This is a decisive difference in comparison with the PPC systems available on market, which do not take into account suppliers and subcontracted suppliers outside the company.

16 Claims, 3 Drawing Sheets

DIAGNOSTIC METHOD AND DIAGNOSTIC SYSTEM FOR MONITORING AVAILABLE RESOURCES IN A PRODUCTION PROCESS

BACKGROUND AND SUMMARY OF THE INVENTION

The invention relates to a diagnosis method and system for monitoring the available resources in a production process and to a diagnosis system with the aid of which this method can be implemented.

The production of complex products by a system provider takes place in a hierarchical production process in which a large number of different resources in the form of raw materials, semifinished products, components and services are required in the successive stages of production. These resources are procured by the system provider from supply links, some of which may be in-house suppliers, while others may be outside suppliers. To avoid capacity shortages in the supplies to the system provider, resources in the form of reserves and stocks are kept by the supply links, tying up a considerable proportion of capital. If these stocks become too great, the tied-up capital causes unnecessary costs. If the stocks become too low, on the other hand, delivery dates cannot be met. This is particularly so when there are fluctuations in demand. As a result, losses may arise. There is therefore a great need to optimize the available resources in the production process in such a way that the costs associated with them are minimized.

Conventional production planning and control systems deal with the questions and planning tasks arising during the design of the production process in a cascading procedure. This produces a static appraisal of the operations. Successful use of an integrated overall system for describing and planning the production process presupposes that all the data necessary for monitoring the production process can be made available at any time. This requires not only continuous monitoring of the reserves and stocks of all the supply links involved in the production process, but in particular also data concerning the design of the production and logistical processes, capacity utilization etc. of each individual supply link.

To obtain a realistic picture of the production process in its entirety and its behaviour when fluctuations in demand occur, the individual steps must be treated as parts of an integrated system which includes the complete production process. Such a planning and diagnosis system, with the aid of which a complex production process can be planned and constantly kept up-to-date for applications within a single company is known, for example, from WO 98/08177.

If, however, the production process also includes legally independent suppliers operating freely in the market, data which can be continuously called up concerning capacity utilization, production and logistical processes etc. of the supplier are generally not available. This information forms part of the core know-how of the supplier, which outside parties, in particular other suppliers or competitors—are not permitted to view. Consequently, existing overall systems for describing and planning the production process can be meaningfully used only for planning within a single company, and the systems will fail if they are distributed among different parties within different companies and if outside suppliers are incorporated.

Therefore, it is an object of the invention to propose a diagnosis method which permits continuous monitoring of the available resources in a production process in which outside supply links are incorporated. Furthermore, it is an object of the invention to provide a diagnosis system with which this diagnosis method can be implemented.

Accordingly, the entire network of supply links involved in the production process is replicated in its complexity, with the associated lead times for each individual supply link, in a diagnosis system. The diagnosis system also contains continuously updated data concerning the predicted gross demands and a demand forecast of the system provider, information on the current reserves and stocks of each individual supply link and, for each supply link, an identification number, which is a measure of the responsiveness of the supply link to changes in the demands of the system provider. The diagnosis system in this case replicates a production system operating on the "pull principle", in which the demands of the system provider form the trigger for the entire production chain—and consequently also for each individual supply link.

The predicted demands of the system provider and the information concerning the current reserves and stocks of each supply link are used as a basis to calculate in the diagnosis system whether the current stocks of the supply link concerned are sufficient for the predicted demands of the system provider. The calculation uses the identification number of the supply link. The results of this calculation are available at any time to all the supply links —together with the structure and all the lead times of the entire network of supply links. Consequently, each supply link receives from the diagnosis system information on which amounts of the goods provided by it are required at which point in time by the system provider or by other supply links. On the other hand, the supply link learns at which points in the network capacity shortages have occurred and consequently has the possibility of adjusting its own capacities (stocks, capacity utilization etc.) accordingly. For example, if it can see in advance that another supply link, supplying to it, cannot provide the required amounts of raw material, the supply link can possibly look around in time for an alternative supplier. Or the supply link can establish that shortages exist in the case of another supply link, downstream in its supply chain, and this supply link will request lower sales volumes from the other supply link on the basis of the pull principle, and can cut back its own capacity in time. Each supply link can consequently detect shortages and help in advance to eliminate them. The supply link can also use this information to optimize its stocks, which for the most part result from inadequately coordinated capacities. Since stocks kept by supply links are synonymous with multiple storage of products at different value-adding stages, considerable savings can consequently be achieved in the entire production process.

By simultaneously providing all the information relevant to the system provider and the supply links in the diagnosis system, information flows both in the forward direction and in the backward direction are possible in the network of supply links. The diagnosis system consequently has the function of an early-warning system in the short-term and medium-term periods, allowing all those involved in the network to respond appropriately and timely to local disruptions in the production process. Furthermore, all changes in demand and stocks (for example in the stocks of a supply link) can be fed directly by the system provider and the supply links online into the diagnosis system and consequently can notify simultaneously all those involved in the production system. This allows phasing-out costs when a model is discontinued to be minimized. Furthermore the launch of a new model on the production system can take place in parallel with models already in production without great additional effort.

A particularly concise way of representing the supply capability of each supply link is achieved by using a traffic-light function, in which a supply link is given a "green light" if the stocks kept by this supply link correspond at least to the predicted demand, whereas the supply link is given a "red light" if its stocks are below the predicted demand.

To allow an uninterrupted information flow on the current standing of the supply chain to be ensured, even in the event of a data failure of a supplier, a lead time is expediently determined in advance for each supply link. The lead is the time interval between the incoming-goods or outgoing-goods point of this supply link and the assembly site of the system supplier. This is because, irrespective of the provision of data concerning current stocks by the supply links, it is possible on the basis of the demands of the system provider to calculate, using the lead time at any point in time the amounts of reserves, semifinished products etc. which should be present in the stores of the supply links at this point in time.

It is also expedient to use an interpreter list to reference the intermediates supplied by the supply links to the end product produced by the system provider. This interpreter list ensures the "translation" between the nomenclatures of parts of the supply links and the designation of parts used by the system provider, and ensures that each supply link is informed as to the amounts and types of raw materials and intermediates to be supplied by it, from which the end product is produced by the system provider.

The diagnosis system is expediently accessed via the Internet. In this way it can be ensured that supply links around the world can view the current status of the network at any time and can themselves feed their current data into the information system.

The diagnosis system consequently ensures the greatest possible transparency of the entire production process and the resources of all the supply links involved in it, since it is possible for outside supply links to obtain company-internal parameters for themselves at the same time. Although the supply link must specify an identification number, which is a measure of its supply capability (and consequently at least indirectly contains internal process and capacity utilization data), the determination of this identification number is left to each individual supply link itself. The supply link can consequently make known its supply capability and supply readiness by the choice of its identification number and at the same time retains the greatest possible autonomy.

A range, which is a measure of the time period over which the supply link is capable of balancing out fluctuations in demand of the system provider, is expediently chosen as the identification number of the supply link. If the supply link indicates a very small range for its supply capability, and consequently presents itself as very "agile", it indicates by this that it can very rapidly adapt its process stage to changed demands of the system provider. However, this involves the risk of the supply link having supply problems if there are strong or medium-term fluctuations in the demand of the system provider, which is expressed by a "red" traffic light. If, on the other hand, the supply link indicates a very large range for its supply capability, this suggests that the supply link has large stocks, which it can use to balance out fluctuations in demand. Consequently, its traffic light remains "green" even when there are large changes in the demand of the system provider, but it must be assumed, in particular if ranges are exceedingly high, that the supply link has overdimensioned its store and is consequently keeping considerable dead capital.

Observing the traffic lights, and consequently monitoring the output of the diagnosis method, over a certain period of time therefore gives both the system provider and the supply links valuable indications as to whether, and to what extent, process stages and storage capacities of the supply links can be optimized, in order to ensure a satisfactory supply capability with the lowest possible storage costs. An important aspect here is that, in the diagnosis method according to the invention, the system provider primarily assumes the role of an observer and, in particular, need not assume any responsibility for the smooth operation of the supply chain. Only the structure of the supply network and continuously updated values for the predicted demand figures are provided to the system provider regulating the stocks kept by the supply links is then the responsibility of the supply links themselves. This is an important prerequisite for working together with legally independently operating companies. The diagnosis method consequently describes a self-regulating system in which the supply links choose, on the basis of information made available to them in the diagnosis system by the system provider and the other supply links, their own "optimum operating state" and consequently contribute to the optimization of the entire supply chain. In particular, no optimization of the entire supply network is carried out by the system provider. Such wide-ranging optimization would mean a far-reaching intervention into the autonomy of the supply links and would consequently be unacceptable to the majority of the supply links.

However, the diagnosis system allows the system provider to carry out continuous monitoring of shortages in stocks and in particular in supplies in the network of the supply links. Consequently, impending supply shortages among subcontracted suppliers can be detected in the short and medium terms. An early response to the shortages increases the delivery capability of the supply chain overall.

BRIEF DESCRIPTION OF THE DRAWINGS

The invention is explained below on the basis of an exemplary embodiment represented in the drawings, in which.

DETAILED DESCRIPTION OF THE DRAWINGS

Figure 1:
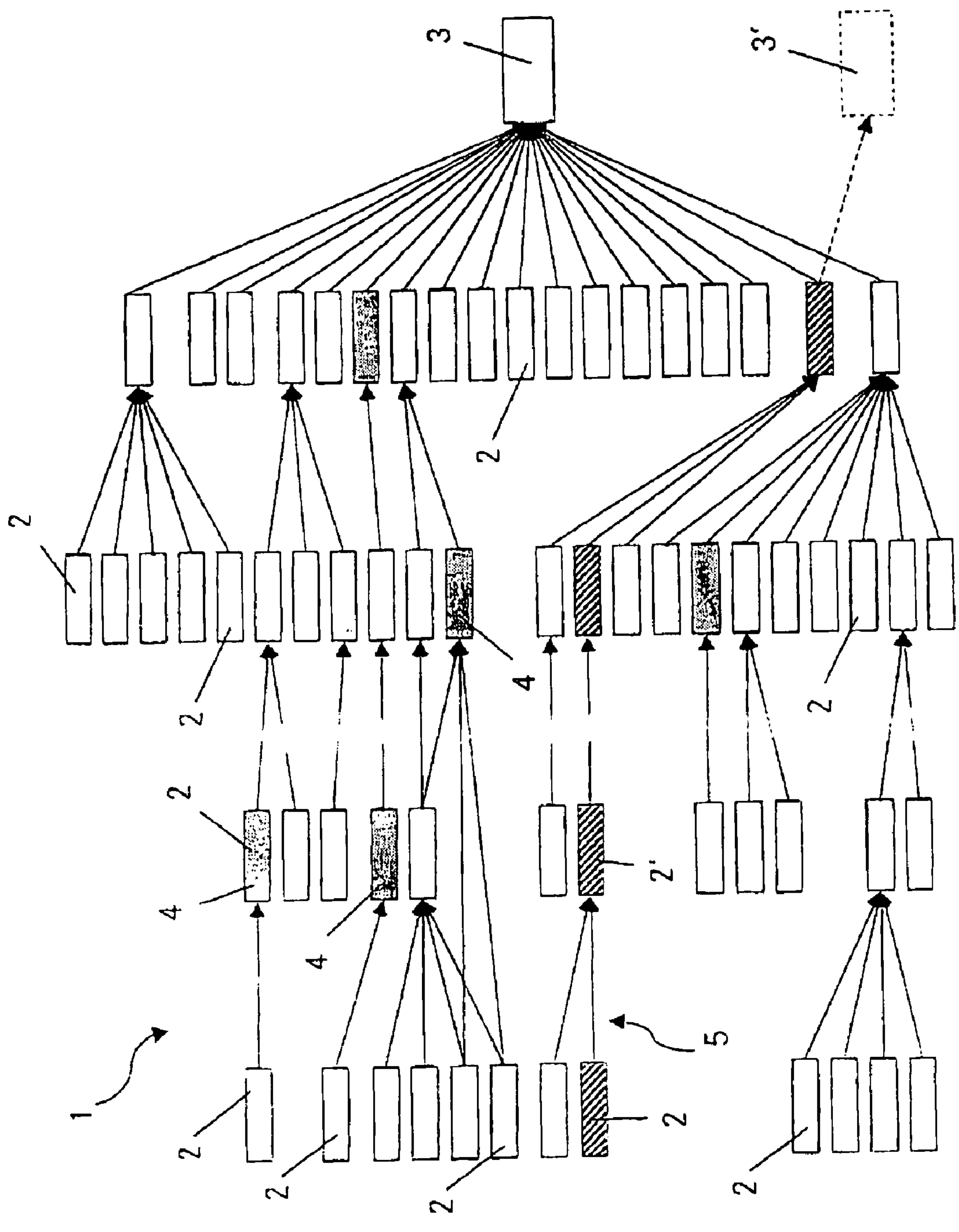
FIG. 1 shows a schematic representation of a network of supply links involved in a production process.

FIG. 1 shows a representation of a production process, in which raw materials, semifinished products and system components from which an end product is produced by a system provider 3, are provided by a network 1 of supply links 2. Each supply link 2 in this network 1 is represented in FIG. 1 in the form of a small box; the arrows between the boxes indicate the direction of supply between the supply links 2. The term "supply link" refers here not only to production plants for raw materials, semifinished products or system components, but also to service providers, such as transport agents 4 for example (the boxes of which are shown with a light-grey background in FIG. 1). The supply links 2 jointly supply to the system provider 3, which represents the final link of the network 1. The majority of the supply links 2 within the network 1 are interconnected in a manner in which they are dependent on one another in the form of supply chains 5. A supply link 2 supplies goods to the supply link 2' following it in the supply sequence. An example of supply links 2 which together represent such a supply chain 5 is shown hatched in FIG. 1.

Figure 2:
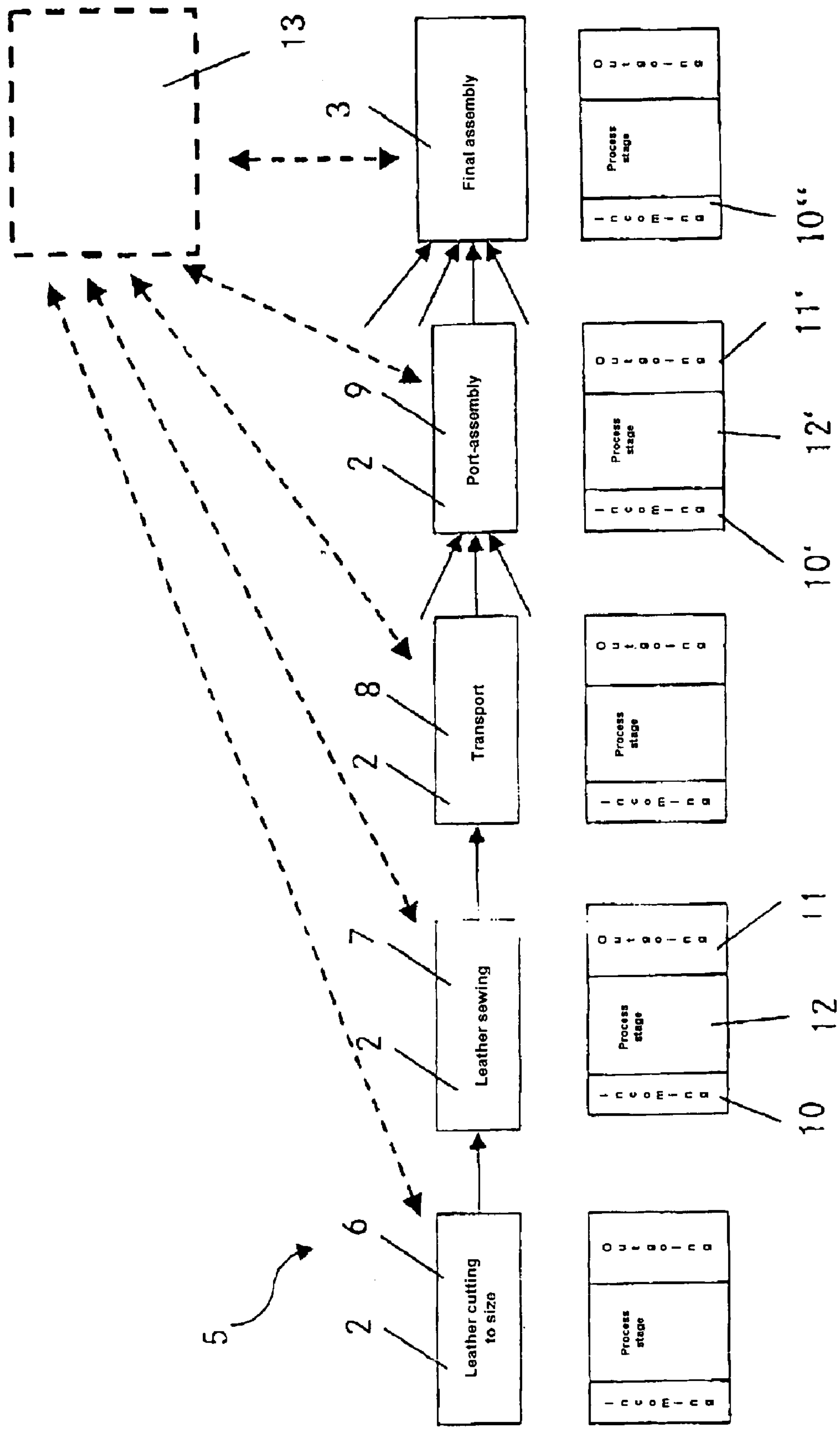
FIG. 2 shows a selected supply chain in the network of the supply links.

FIG. 2 shows an actual example of a supply chain 5 including a plurality of supply links 2. This example concerns the production process of leather components, which are assembled by the system provider 3 as part of a door lining of a car. The supply chain 5 comprises three production plants 6, 7, 9, two of which production plants 6 (cutting leather to size) and 7 (sewing leather) are located in South Africa, and one production plant 9 (door lining part-assembly) is located in Germany. Furthermore, the supply chain 5 includes a transport company 8, which transports the semi-finished leather products from South Africa to Germany. As shown in FIG. 2, each supply link 2 has an input buffer 10, an output buffer 11 and a process stage 12, which may comprise one or more stages of production, transport stages etc. The buffers 10, 11 represent stocks and serve the purpose of at least partly decoupling the material flow between the other supply links 2 located in the supply chain 5. For example, the input buffer 10' of the production plant 9 ensures that the production plant 9 has sufficient semifinished leather products available for the part-assembly of the door lining until the next delivery is made. To be able to assemble door linings even when there are supply difficulties at the production plants 6 and 7 or the transport agent 8, it may be advisable for the production plant 9 to make its input buffer 10' larger. The size of the input buffer 10' of the production plant 9 is consequently dependent to a great extent on how well the production plant 9 is informed about the current state of the production plants 6, 7 and the transport agent 8 supplying to it. The output buffer 11' of the production plant 9 on the other hand ensures that the production plant 9 has sufficient part-assembled door linings available to supply to the system provider 3 even when there are difficulties in its own process stage 12' or if there is an increased demand by the system provider 3.

To produce a certain number of the end products, the system provider 3 requires a certain amount of the goods or services supplied in time by the supply links 2. The demands of the system provider 3, in their time sequence projected into the future, are encoded, according to the "pull principle," into demands with respect to each individual supply link 2 in the network 1. To calculate the demands of each individual supply link 2, a certain percentage of waste must be taken into account, at least for some supply links 2 of a supply chain 5, on account of inadequate quality. The gross demands of the supply links 2 are therefore generally higher than those demands which would result from a naive calculation back from the demands of the system provider 3. In addition, the further away from the end stage of the system provider 3 the supply link 2 is in the supply chain 5, the higher the gross demand.

Figure 3:
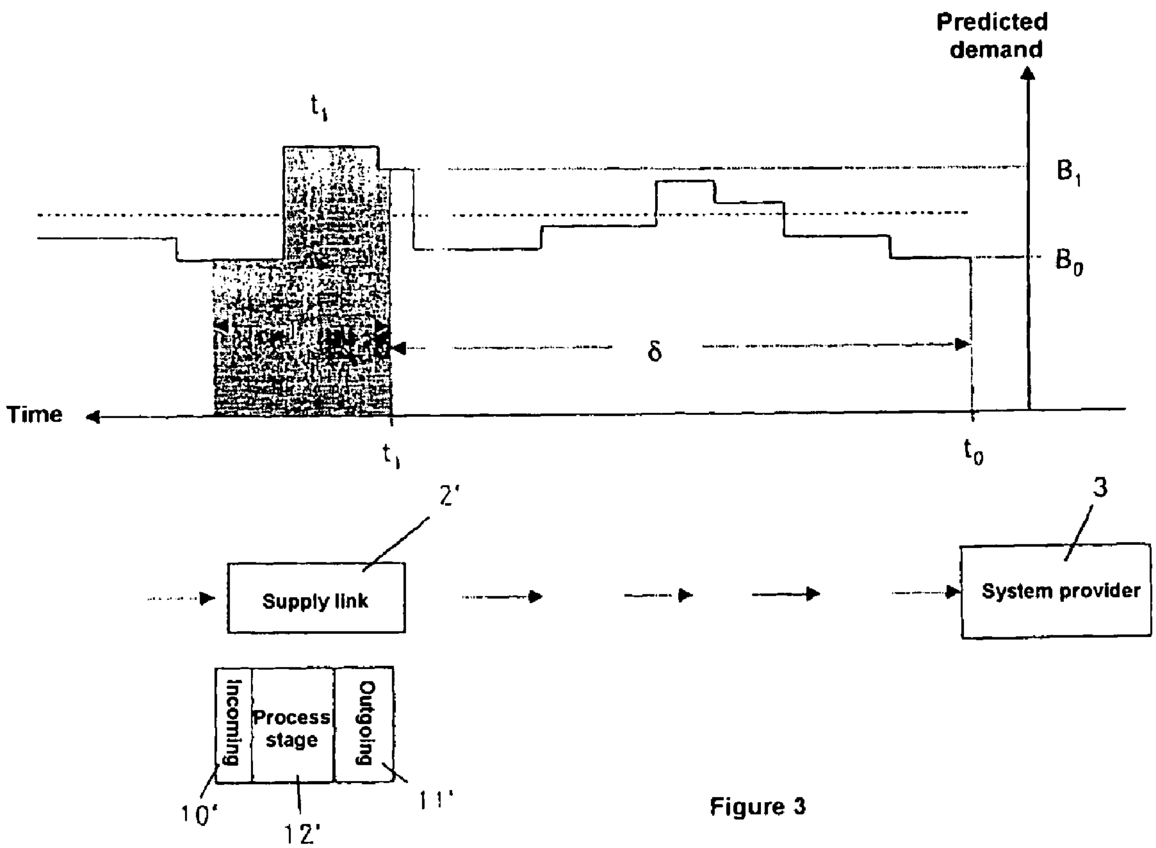
FIG. 3 shows a representation of the predicted demand of a system provider and the resultant desired stocks which must be kept by the supply links.

To calculate the gross demands with respect to each supply link 2, lead times, caused for example by the process stages of the supply links 2, must be taken into account. FIG. 3 shows a diagram of the predicted demands of the system provider 3 with respect to a specific supply link 2' in its time sequence. $B_0$ designates here the amount of the semifinished product provided (at an earlier point in time) by supply link 2', which is being assembled at the current point in time $t_0$ by the system provider 3. If $\delta$ designates the lead time of the supply link 2' in the supply chain 5, the supply link 2' must be able at the present point in time $t_0$ to supply an amount $B_1$ of the semifinished product to allow the demand of the system provider 3 for semifinished product (or the components provided from it by other supply links) to be covered at the later point in time $t_1=t_0+\delta$. The lead time $\delta$ of the supply link 2' corresponds to the average time interval between the outgoing-goods point at the supply link 2' and the assembly site at the system provider 3'.

The gross demand $B_1$ is used to determine for the supply link 2' a desired stock, which must be available at the current time $t_0$ in the output buffer 11' of the supply link 2' in order to supply properly to the supply chain 5, and consequently ultimately also to the system provider 3. This calculation is performed using the range T of the supply link 2'. The range T is in this case a supply-link-dependent parameter, which each individual supply link 2' determines or estimates for itself on the basis of its internal process and storage capacities.

The desired stock in the output buffer 11' of the supply link 2' is then calculated from the total of all the gross demands to be expected in the time period between $t_1$ and $t_1+T$:

$$\text{desired stock} = \int_{t_1}^{t_1+T} \text{gross demand}$$

This desired stock is shown with a gray background in FIG. 3.

If the momentary stock of the output buffer 11' of the supply link 2' is less than the desired stock, there is the risk of the supply link 2' being unable at the time $t_0$ to satisfy the demands $B_1$ required by the system provider at the time $t_1=t_0+\delta$. Such a discrepancy is covered by a "warning function", whereas an actual stock exceeding the desired stock is referred to as "in order". The range T, by which the supply link 2' characterizes its own buffering and process capacities, consequently has the meaning of a "response time". If the supply link 2' has a process stage 12' with a variable capacity and consequently can be adjusted quickly to fluctuations in demand, the supply link 2' can characterize itself by a small range T. This is because it is then possible to compensate for a large part of a (time-limited) increase in demand by a temporarily increased utilization of the capacity of the process stage 12' (for example of production), and only a small part of the output buffer 11' is in this case emptied to meet the increased demand. If, on the other hand, the supply link 2' has a slow-responding process stage 12', fluctuations in demand can only be balanced out with a great time delay. Such a supply link 2' must therefore set up a correspondingly large output buffer 11', to be able to supply at any time the required gross demands in time, even if there are fluctuations in demand.

The range T, to be set by each supply link 2' itself, is consequently a measure of the time period over which the supply link 2' is capable of balancing out fluctuations in demand. If the supply link 2' chooses a long range T, the gross demands are averaged over a long time period T to calculate the desired stock of the output buffer 11'. In this way, fluctuations in demand are averaged out.

By analogy with the determination of the range T for the output buffer 11', a range T' can also be determined for the input buffer 10' of the supply link 2', used for calculating the desired stock of the input buffer 10'.

Provided for the continuous monitoring of the supply capability of the entire network 1 of the supply links 2 is a diagnosis system 13, shown with broken lines in FIG. 2. This diagnosis system 13 contains all the information concerning the interconnection of the supply links 2 and the ranges T, T' of all the supply links 2. In addition, the lead times δ of supply links 2 are stored in the diagnosis system 13. Further, the diagnosis system 13 contains current data concerning the predicted demands of the system provider 3 and the stocks of the buffers 10, 11 of all the supply links 2. These data are continuously kept up-to-date. In the diagnosis system 13, the supply capability of each individual supply link 2 is continuously determined from the current demand and stock data by using the ranges T, T' of the supply links 2 regardless whether or not the stocks of the buffers 10, 11 of the supply link 2 exceed the predicted demands.

Each supply link 2 in the network 1 is notified of the result of this check, and the accompanying "warning function". This is indicated in FIG. 2 by the broken arrows, which link the diagnosis system 13 to each supply link 2. Each supply link 2 consequently receives from the diagnosis system 13 data/information concerning (potential) supply incapabilities of the other supply links 2 in the network 1. It is then the responsibility of the supply link 2 to determine the consequences from this overall information to adapt its own buffers 10, 11 or process stages 12 and/or to take corresponding action with respect to other supply links 2 on which it depends. No planning interventions in the individual plans of the supply links 2 take place from the system provider 3, so that the planning sovereignty of each individual supply link 2 is preserved.

Since the lead times δ of all the supply links 2 are replicated in the diagnosis system 13, each supply link 2' can view the lead times δ of all the other supply links 2. Consequently, the diagnosis system makes the lead times δ and their dependencies on one another transparent for all the supply links 2. If, for example, because of a data failure, one of the supply links 2' cannot supply any data concerning its buffers 10, 11, the volumes to be supplied can nevertheless be calculated on the basis of the lead times δ and the demands of the system provider 3 for all the other supply links 2 and made available to these supply links 2. Even in the event of a (local) data failure, the "warning function" therefore operates for all the other supply links 2.

The diagnosis system 13 is expediently implemented as a data processing program on a central computer. The central computer is located for example at the site of the system provider 3, and the supply links 2 expediently access the diagnosis system 13 via the Internet. To ensure that only current supply links 2, involved in the supply network 1, can view the diagnosis system 13 and have rights to enter data on it, access to the Internet page concerned is protected by a password.

The discrepancies between the demand and the stock kept by a supply link 2 are expediently visually presented in the diagnosis system 13 in the form of a traffic-light function. Accordingly, the input and output buffers 10, 11 of each supply link 2 are allocated a traffic light, which can indicate the colors green (for "demand and stocks match") or red (for "demand and stocks are in disparity"). Every supply link 2 can therefore see from the diagnosis system 13 whether and to what extent the supply links 2 ahead of it in the supply chain 5 are capable of meeting future demands. At the same time, the diagnosis system 13 allows the system provider 3 to check along the entire supply network 1 whether the necessary goods can be provided on time by the supply links 2. Furthermore, the traffic-light function offers the supply links 2 reference points for the design of their buffers 10, 11. If the traffic light of a supply link 2 is constantly at "green", the current stock kept by this supply link is continuously above the desired stock. The buffers 10, 11 of this supply link 2 have therefore possibly been chosen to be too large. In this case, this supply link 2 can achieve considerable cost savings by a reduction in its buffers 10, 11. If, however, the traffic lights of many supply links 2 are noticeably often at "red" in one branch 5 of the network 1, this indicates problems of the supply links or could be an indication of an incorrect estimation of the lead times d. In this case, a careful analysis of the dependencies on one another of the supply links 2 in this branch 5 is recommended.

The reference between the goods to be supplied on the part of a supply link 2 (raw materials, semifinished products) and the end product of the system provider is expediently replicated by using an interpreter list. For example, for the production of a door lining which bears the part number "13687.99" at the system provider 3, one large cut-to-size piece of leather and three identical small cut-to-size pieces of leather are required as supplied parts. These cut-to-size pieces of leather are designated at the supply link 2 by the part numbers "LZ 3458-7" and "LZ 3469-2". The interpreter list consequently contains the information that, to produce each door lining, one part with the number "LZ 3458-7" and three parts with the number "LZ 3469-2" of the supplier 2 are required, and these are jointly allocated to the end product with the number "13687.99" of the system provider 3. The interpreter list consequently contains the complete information on the construction of the end product of the system provider 3 from the raw materials, semifinished products and intermediates made available by the supply links 2. The interpreter list forms part of the diagnosis system 13 and allows the exact encoding of the goods and services which are necessary for the production of the end product.

Up to now a description has been given of the case of an interconnected supply chain 5 in which the supply links 2 supply sequentially in strict dependence. However, the network 1 of the supply links is generally non-linear, as represented in FIG. 1, so that a supply link 2 is supplied by a number of other supply links 2. Furthermore, a supply link 2 (for example a forwarding agent) may also be represented a number of times in a single supply chain and/or may be represented simultaneously in a number of different supply chains 5 (for example supply link 4 in FIG. 1). In this case, the supply link 2 must optimize (internally) the design of all the buffers 10, 11 and the capacity utilization of all its process stages 12 in a way such that it is capable of satisfying simultaneously all the demands placed on it by the system provider 3. Finally, the semifinished products provided by a supply link may also be assembled on the part of the system provider 3 at a number of different production sites 3', so that, as represented by broken lines in FIG. 1, the semifinished products are delivered not only to the system provider 3 itself, but also to other sites 3'.

What is claimed is:

1. Diagnosis method for monitoring the available resources in a production process with supply links, which comprise in particular production plants and/or service providers, in which components are supplied by a number of supply links to a system provider, which puts these components together to form a system, in which any number of supply links are situated in relation to one another in an interconnected supply chain, so that they are in turn supplied by other supply links, each supply link having an input buffer, an output buffer and a process stage, the diagnosis method comprising the steps that firstly an identification number is determined for each supply stage on the basis of the design of its buffers and its process stage, that information concerning the predicted demands of the system provider in their time sequence is made available by the system provider continually over time to each supply link, that information concerning the momentary stock of its buffers is supplied continually over time by each supply link, that the identification numbers of the supply links are used to determine continually over time whether their momentary buffer stocks satisfy the predicted demands of the system provider, and that the results of this assessment are made available continually over time to the supply links.

2. Diagnosis method according to claim 1, wherein the identification number of a supply link is determined by this supply link itself.

3. Diagnosis method according to claim 1, wherein the results of this assessment are made available to the supply links in the form of a traffic-light function.

4. Diagnosis method according to claim 1, wherein a range, which is a measure of the time period over which the supply link is capable of balancing out demand fluctuations of the system provider, is chosen as the identification number for the determination of the supply capability of the supply link.

5. Diagnosis method according to claim 1, wherein a lead time δ, which corresponds to the time interval between the input buffer or output buffer of the supply link and the input buffer of the system provider, is determined for each supply link.

6. Diagnosis method according to claim 1, wherein an interpreter list, which contains the reference of the intermediates produced by the particular supply link to the end product of the system provider, is created for each supply link.

7. Diagnosis system for monitoring the available resources in a production process, a network of supply links (2, 2', 4) which supply to a system provider being involved in the production process, each supply link having an input buffer, an output buffer and a process stage, and any number of the supply links being situated in relation to one another in an interconnected supply chain, the diagnosis system replicating the interconnection of the supply links with respect to one another, and also containing data concerning predicted demands of the system provider and also identification numbers and data concerning momentary buffer stocks of all the supply links, wherein each supply link's identification number is determined on the basis of the design of its buffers and its process stage, and it being possible for the data contained in the diagnosis system to be called up by the system provider and all the supply links.

8. Diagnosis system according to claim 7, wherein the diagnosis system is accessible to the supply links via the Internet.

9. A diagnosis method for monitoring available resources in a production process, the production process including a system provider and a plurality of supply links that supply components to the system provider for assembly into a system, the supply links being placed in an interconnected supply chain, each supply link having an input buffer, an output buffer and a process stage, the diagnosis method comprising:

providing an identification number for each supply link on the basis of the design of its buffers and its process stage;

the system provider providing to each supply link information concerning the predicted demands of the system provider as a function of time;

each supply link providing information concerning the momentary stock of the supply link's buffers;

determining whether each supply link's momentary buffer stocks satisfies the predicted demands of the system provider, using the identification number of the supply link; and providing to the supply links the results of determining whether each supply link's momentary buffer stocks satisfies the predicted demands of the system provider.

10. The diagnosis method according to claim 9, wherein each supply link determines its own identification number.

11. The diagnosis method according to claim 9, further comprising providing to the supply links, in the form of a traffic-light function, the results of determining whether each supply link's momentary buffer stocks satisfy the predicted demands of the system provider.

12. The diagnosis method according to claim 9, wherein each supply link's identification number is a range, which is a measure of the time period over which the supply link is capable of balancing out demand fluctuations of the system provider.

13. The diagnosis method according to claim 9, further comprising determining a lead time (δ) for each supply link, which lead time corresponds to a time interval between the input buffer or output buffer of the supply link and the input buffer of the system provider.

14. The diagnosis method according to claim 9, further comprising creating an interpreter list for each supply link, which list links intermediary products produced by the supply link to an end product of the system provider.

15. A diagnosis system for monitoring the available resources in a production process that includes:

a system provider;

a network of supply links which supply to the system provider, each supply link including:

an input buffer, an output buffer, and a process stage; and a supply chain including a number of the interconnected supply links, the diagnosis system comprising:

a replication of the interconnection of the supply links;

data concerning predicted demands of the system provider;

identification numbers for the supply links, wherein each supply link's identification number is provided on the basis of the design of its buffers and its process stage; and data concerning momentary buffer stocks of the supply links, wherein the data contained in the diagnosis system are accessible by the system provider and the supply links.

16. The diagnosis system according to claim 15, wherein the diagnosis system is accessible to the supply links via the Internet.

* * * * *